March 2, 1965  R. F. RASMUSSEN  3,171,329
CONTROL APPARATUS
Filed May 6, 1963
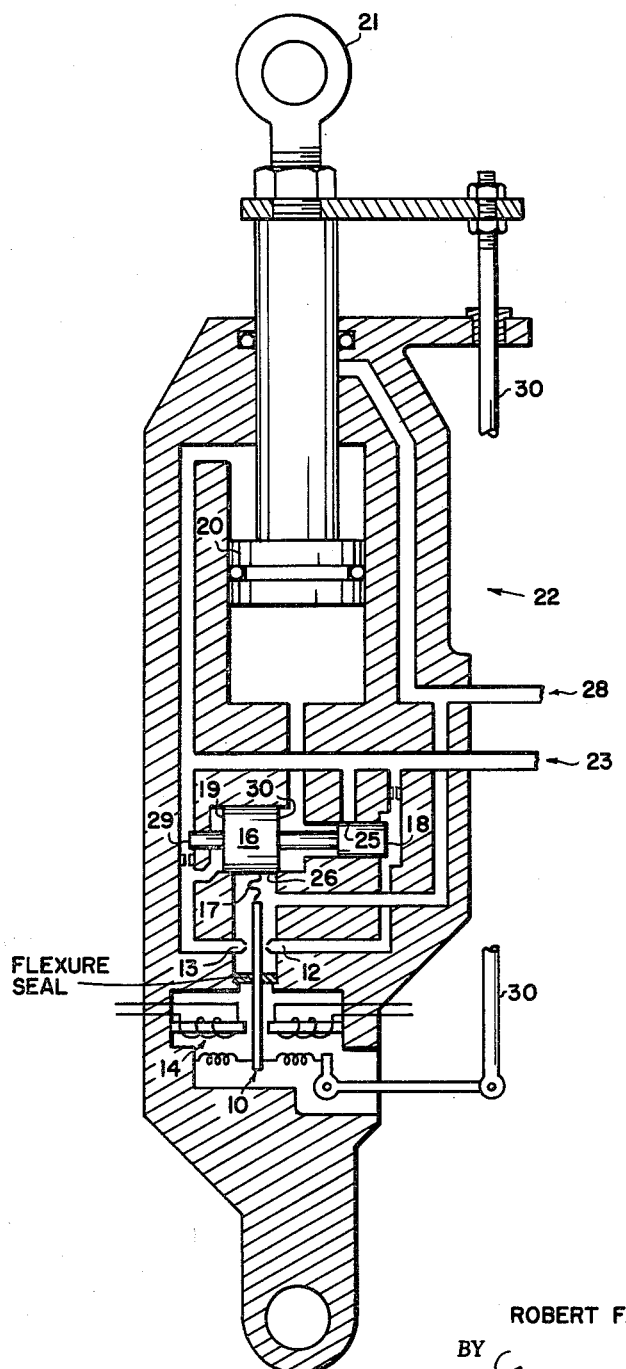
INVENTOR.
ROBERT F. RASMUSSEN
BY
*Gordon Reed*
ATTORNEY

United States Patent Office 3,171,329
Patented Mar. 2, 1965

3,171,329
CONTROL APPARATUS
Robert F. Rasmussen, Brooklyn Center, Minn., assignor to Minneapolis-Honeywell Regulator Company, Minneapolis, Minn., a corporation of Delaware
Filed May 6, 1963, Ser. No. 278,300
2 Claims. (Cl. 91—365)

This invention pertains to control apparatus that operates a condition control member, and more particularly to a fluid servomechanism therein. With more particularity the invention pertains to an electro-hydraulic servo system of the closed loop type operating against a load of high inertial force.

In prior electro-hydraulic servo systems of the proportional closed loop type, an electrical or mechanical followup provides a signal in accordance with the positioning of an output member of the servo system. This signal is applied in feedback relation into the servo system control valve operator to cancel or nullify an electrical signal fed into the operator that controls the position of the hydraulic servo control valve.

It is an object of this invention to provide an improved fluid type servo system of the closed loop type with compensating feedback tending like proportional feedback to cancel the effect of initial command signals.

It is an object of this invention to provide an improved hydraulic servo system of the closed loop type with compensating feedback tending like proportional feedback to cancel the effect of initial command signals.

It is a further object of this invention to provide an an electro-hydraulic servo system of the closed loop type compensating feedback means opposing the initial command signal, the feedback means comprising a displacement component, a velocity component, and an acceleration component related to the operation of the servo system output member for improving the stability of operation of the servo system.

It is a further object of this invention to provide novel means for improving the stability of a servo system by supplying a compensating feedback signal in its control in accordance with the acceleration force of the servo system output member.

Other more specific objects and features of the invention will appear from the description to follow with reference to the drawing, in which:

The figure is a sectional schematic diagram of a system incorporating the feedback arrangement in accordance with the invention.

The invention has been illustrated as being applied to an electro-hydraulic servo system of the type having a flapper valve or plate positionable relative to two opposed flow nozzles by magnetically actuated means controlled by a command signal. Relative displacement of the element relative to the two opposed nozzles results in a differential pressure upon opposite ends of a control valve causing its displacement and resulting in the application of differential fluid pressure on opposed ends of a power piston that operates the output member of the servo system. The above mentioned structure is shown in U.S. Patent 2,767,689, wherein plate 58 is the flapper valve. The novel feedback means of the subject invention relates to the repositioning of the movable plate or flapper valve following its initial movement by the actuated means from the command signal.

The system shown in the figure includes conventionally an electrical motor operated valve element 10 normally assuming a position intermediate a pair of opposed nozzles 12, 13 and displaceable oppositely relative to the nozzles upon energization of its motor means 14 from an electrical command signal as from an external signal source. The movement of the valve element 10 relative to the opposed nozzles 12, 13 results in a differential fluid pressure or force being applied to the opposed ends of a spool valve 16. This displacement of the spool valve causes a difference in the force on opposed ends of a movable member such as a power piston 20 in power section 22 resulting in operation of the servo system output member 21 which is connected to a condition control device or load (not shown). The displacement of the power piston 20 results in operation of a mechanical feedback arrangement 30 that repositions the valve element 10 toward the intermediate position, providing a closed loop system. This closed loop servo system thus is similar to that disclosed in U.S. Patent 2,886,010 of May 12, 1959, see FIGURE 3 therein.

In addition to the displacement feedback, the arrangement includes a velocity feedback obtained by interconnecting the plug valve 16 with the electrically operated valve element 10 by a spring 17.

Also, in addition to the displacement feedback by arrangement 30 operated by power section 22 through output member 21, and the velocity feedback by spring element 17, there is additionally provided a third feedback arrangement. Involved in this third feedback arrangement are various circular areas of the plug valve 16. For initial displacement of the plug valve 16 due to differential displacement of the element 10 by its torque motor, the circular area 18 and the circular area 19 of valve 16 are supplied with opposing forces or pressures. For this purpose, the pressure line 23 supplies conventionally through an orifice, pressure to circular area 18 and pressure line 23 also through an orifice supplies pressure to the circular area 19 of valve 16. Normally the two opposing forces on valve 16 are in balance so that portion 25 of valve 16 cuts off the pressure line 23 from the cylinder chamber below piston 20 in power section 22, in the figure, and similarly the portion 26 of valve 16 cuts off the cylinder below piston 20 from the fluid return line 28.

For the purpose of providing the third feedback, a circular end area portion 29 of valve 16 opposes by the pressure applied thereto from the pressure line 23 an opposite pressure on circular area portion 30 which is in communication with the portion of the cylinder chamber below piston 20. The area of portion 29 of valve 16 is equal to one-half the area of portion 30, and the pressure on portion 29 is normally line pressure whereas the pressure on the portion 30 is one-half line pressure so that the two opposing forces are in balance, normally.

It is evident that if the spool valve 16 be displaced slightly to the left of the position shown in the figure, that the portion of the cylinder below piston 20 is in communication with the return line 28 and that consequently the pressure below piston 20 will decrease. Therefore, the pressure from line 23 applied to the portion of the piston 20 in the upper chamber of the cylinder will cause downward movement of piston 20. It is also apparent that if the spool valve 16 be moved slightly to the right of the position shown in the figure, that the lower end of the cylinder is in communication with the pressure line 23. Since the area of piston 20 in the lower portion of the cylinder is twice that area of the piston in the upper portion of the cylinder, the piston 20 due to the greater total force in the lower portion of the cylinder will consequently move upwardly.

Reviewing the various feedbacks, it is apparent that through the displacement feedback arrangement 30 connected between valve 10 and the servo output member 21, that the displacement of the output member 21 of the servomotor that tends to center element 10 is in accordance with the magnitude of the electrical signal that energizes the torque motor or motor means 14 that displaces the valve element 10.

For the second feedback, limiting operation of piston 20, the valve element 10 tends to be centered by operation of the valve spool 16 through spring 17. Consequently, the amount that the valve spool 16 is moved is in accordance with the difference between the positional feedback signal produced by the springs in linkage 30 and magnitude of the signal that energizes the torque motor 14 of valve element 10. Since the servo rate is a function of valve spool opening, effectively a servo velocity feedback signal is provided through the spring interconnection.

The third feedback may be more readily appreciated by considering its operation. For this purpose, assume that the energization of torque motor 14 has been in such direction that valve element 10 through its flexure seal mounting moves clockwise in the figure thereby tending to close off nozzle 12 and to further open nozzle 13 to release of fluid to return 28. This displacement of valve element 10 results in an increase in the pressure on circular area 18 of valve 16 and a decrease in the pressure on circular area 19 of valve 16. The valve spool 16 consequently moves leftwardly in the figure and its displacement is limited by the velocity feedback spring 17. The fluid in the portion of the cylinder below piston 20 now may flow out valve portion 26 to the return line 28. If we assume that the servomotor is operating against a load having large inertia, the load member 21 may not immediately move despite the greater pressure on the upper side of piston 20 over that on the lower side. The difference in pressures on the upper and lower areas of the piston 20 now becomes greater with member 21 stationary. Also the differential pressure on areas 29 and 30 of valve spool 16, connected to the opposite sides of piston 20, increases. This increased differential pressure tends to move valve 16 rightwardly in the figure.

Thus since the operation of the velocity feedback connection 17 tended to limit the initial leftward displacement of valve spool 16, the differential pressure on valve areas 29, 30 tends to resist movement of the valve spool 16 leftward in the particular instance tending to terminate movement of piston 20. Thus both the velocity feedback, and the feedback due to differential pressure on areas 29, 30 oppose the displacement of the valve 16 leftwardly in this instance. In other words, the velocity feedback tends to equalize the outflow from nozzles 12, 13 thereby tending to equalize the pressures on area 18, 17 of valve spool 16 to stop further valve movement. The differential pressure on areas 29, 30 effects a pressure directly on the spool 16 tending like the velocity effect to oppose leftward displacement of spool 16. The magnitude of this differential pressure on valve spool 16 will vary with the magnitude of the inertia load to be positioned by the servo output member 21. In a sense this may be considered an acceleration force feedback signal.

This differential pressure feedback signal applied to the valve spool 16, tends to increase the stability of this servomotor system especially when it is applied to the movement of loads having large inertias. By this is meant that the acceleration feedback reflected in the differential pressure on areas 29, 30 tends to move the valve spool 16 rightwardly as the differential pressure on the opposed side of piston 20 increases. Thereby, the tendency of the piston 20 to thereafter overshoot the null position as it is displaced is reduced. Therefore, it will be appreciated that the instant invention fully accomplishes the objects of increasing the stability of operation of the servomotor system. While only one embodiment is disclosed and illustrated in detail it will be realized that the subject invention is not necessarily limited to such details but includes modifications and refinements thereof as come within the scope of the attached claims.

What is claimed as new is:

1. A fluid operated piston type servomechanism comprising: valve means having fluid ports for pressure fluid and a movable spool valve part controlling flow through said ports, said spool valve having a normal position wherein no servo operation occurs and being normally subjected to oppositely exerted balanced fluid pressures on oppositely arranged pressure areas, and movable in respective directions by unbalancing of said fluid pressures; a flapper valve means having a neutral position but operable to selectively unbalance the fluid pressures to said spool valve to effect corresponding movement thereof; mechanical feedback means interconnecting said spool valve and flapper valve to supply a velocity feedback effect; and further means applying a force to said flapper valve in accordance with the acceleration force of said load, said force being derived by a fluid conducting connection between one side of the piston to one end of said spool valve and a fluid conducting connection between the other side of said piston and a transverse area of the spool valve intermediate its ends.

2. In an electro-hydraulic piston type servo system with the piston sides having different areas, having a displaceable flapper valve controlling the position of a spool valve that ports pressure fluid to the actuator piston, said spool valve having pressure application areas at both ends and at two opposed transverse areas: nonelectrical feedback means which functions to nullify initial electrical command signals to the flapper valve torquer whereby the differential pressure is applied between one end and one transverse area for positioning the the spool valve, said feedback means being a force derived from a pressure differential resulting from connecting the other end of the spool valve to one side of the piston and connecting the other transverse area to the other side of the piston applied to the spool in proportion to the acceleration force applied to the load on the actuator piston.

References Cited by the Examiner

UNITED STATES PATENTS

| | | | |
|---|---|---|---|
| 2,625,136 | 1/53 | Moog | 91—417 XR |
| 2,947,286 | 8/60 | Baltus | 91—365 |
| 3,095,906 | 7/63 | Kolm | 137—625.62 |
| 3,096,690 | 7/63 | Hayner | 91—387 XR |

FRED E. ENGELTHALER, *Primary Examiner.*